Nov. 17, 1970    K. BREUER    3,540,232
JOINT ARRANGEMENT FOR ANGULAR AND AXIAL MOVEMENT
Filed April 5, 1968

Inventor
KARL BREUER

BY
McGlew & Toren
ATTORNEYS

United States Patent Office 3,540,232
Patented Nov. 17, 1970

3,540,232
JOINT ARRANGEMENT FOR ANGULAR AND
AXIAL MOVEMENT
Karl Breuer, Mulheim, Ruhr-Speldorf, Germany, assignor
to DEMAG Aktiengesellschaft, Duisburg, Germany
Filed Apr. 5, 1968, Ser. No. 719,116
Claims priority, application Germany, Apr. 15, 1967,
D 52,822
Int. Cl. F16d 3/06, 3/30
U.S. Cl. 64—8
15 Claims

ABSTRACT OF THE DISCLOSURE

A joint arrangement to have a high degree of angular and axial movement is comprised of an outer housing member having a longitudinally extending axis and forming a chamber within which at least one end of a longitudinal extending inner member is disposed. In a zero position of the joint, the axes of the housing member and the inner member are in alignment and a control member, interconnecting the housing member and the inner member, is also disposed on the longitudinal axes. Connected to the control member for displacement with it is a ball cage containing a multiplicity of balls which are arranged between the spaced opposing surfaces of the inner member and the outer housing member. As the inner member is moved in either axial or angular displacement relative to the housing member, the ball cage and the balls are displaced though the balls remain in contact between the opposed surfaces of the inner member and the housing member. Adjustable resilient means are provided within the outer housing member and the members and the control member. The resilient means absorb axial impacts, dampen axial vibrations, and assist the balls in bisecting the distance travelled when the joint is displaced in the axial direction.

SUMMARY OF THE INVENTION

The invention relates to a joint with a high degree of angular and axial movement in which a central control element is secured to a ball cage containing a plurality of balls located in an annular space arranged between the outer and the inner parts of the joint. The balls tend to zero the parts of the joint and are arranged in the ball cage to bisect the angle of deflection as the joint is angularly displaced.

A universal joint for constant speeds is already known as set forth in U.S. Pat. No. 2,352,776. In the case of this latter joint, a spring is located in a bore in the center of the inner part of the joint; this spring is tensioned between the end of the bore at one end and an axially movable plunger located at the other end of the same bore. The task of the spring is to keep the ball in which this plunger terminates outside the bore in constant contact with a mating ball socket. This ball socket is, in turn, located in a larger ball, this latter ball having a diameter equalling approximately twice the diameter of the ball in the inner part of the joint and forming the termination of the plunger located in the bore of the inner part of the joint. The larger ball is carried in a bearing shell movably arranged in a ball cage and rigidly connected via a tapered member to a smaller ball, this latter ball being located in a mating ball socket. This ball socket is machined in a plate arranged symmetrically to the rotary movement and which is, in turn, seated against the shoulder of a bore in the outer part of the joint.

In U.S. Pat. No. 2,010,899, there is also proposed a universal joint with a similar construction to the joint described above. In this second patent, the center of the outer part of the joint features a bore in which a pretensioned spring is located. The pressure of this spring acts on a ball socket movably arranged in the same bore, this ball socket taking one ball of a three-ball pin or lever member. The spherical center portion of this lever member is guided loosely in a central bore of the ball cage. This center portion is connected via an intermediate portion featuring a grooved neck to a further ball seated in a ball socket rigidly arranged in the inner part of the joint. The central bore of the ball cage features a rounded flange pointing toward the inner part of the joint and which enters the grooved neck of the connecting member on the joint being deflected.

These two proposed joints contain not only the disadvantage of an extraordinarily complicated and expensive design, but also, in particular, the shortcoming that the inner part of the joint cannot—or to only a negligible degree—be moxed axially relative to the outer part of the joint, which is of particular importance when the energy of axial impacts must be absorbed or countered, for example.

In contrast to these joints, the present invention provides a universal anti-friction ball joint capable of angular movement which on the one hand permits the highest possible axial relative movement between the inner and the outer parts of the joint and on the other is simple and inexpensive in design while permitting the joint components to be exchanged easily and without difficulty.

In the main, this task is solved in that the control element and the ball cage secured to it are free to move axially along the longitudinal axis of the outer and inner parts of the joint. As these parts of the joint are displaced relative to each other, the ratio of the effective lever arms of the control element always remain uniform.

A main characteristic of the invention lies in the fact that the control element is a member with three balls—as such a known element—the center ball being joined to the end face of a ball cage by means of a split ball socket, and the end balls being axially movable in bores—using bushings if required—in the inner and the outer parts of the joint.

In accordance with a further characteristic of the invention, springs—preferably cup springs—having the same characteristics are interposed between bores or recesses and the bushings, the springs directing the ball cage and its ring of balls to bisect the distance travelled when the joint is not deflected and the inner and outer parts of the joint are moved axially in relation to each other and also serving as a buffer to absorb axial impacts and/or to dampen axial vibrations.

In an advantageous design in accordnce with the invention, the pre-tension of the cup springs can be adjusted in at least one part of the joint using a nut. In accordance with a further feature of the invention, the outer balls can be designed with a heart-shaped cross section, the points of the heart-shaped sections pointing outwards in the axial direction of the joint.

The invention is not positively limited to a control element of ball-lever design. In accordance with a further main characteristic of the invention, the control element can take the form of a four-joint member, a wedge member, or a similar device.

The proposed invention is further improved by a disk attached to the inner part of the joint and serving as a stop for angular movement of the joint and by a further disk attached to the outer part of the joint that serves to limit axial movement and extends so far beyond the angular movement stop disk that both disks meet under the spring pressure in the axial direction.

The proposed invention is finally perfected by providing the disk on the outer part of the joint with three screws arranged about the circumference of the disk and bearing on the disk attached to the inner part of the joint to support the disk on the outer part of the joint with the main purpose of faciliating assembly of the joint or fitting of the joint shaft. By setting the screws unevenly, the required installation angle can also be adjusted in advance.

The advantages offered by the invention are at once obvious and convincing; the joint proposed in accordance with the invention is extremely simple in design. It can therefore easily be fitted and removed. The few moving parts are not subject to any wear worthy of mention and the joint thus has a long service life expectancy. The most important advantage offered by the proposed joint lies in the fact that the inner part of the joint can be moved axially in relation to the outer part of the joint to a high degree even when the joint is deflected to a great extent, i.e., up to about a 30° deflection angle.

A further special advantage is produced by the enclosure of the center ball of the control element in a split ball socket, which means that, when the joint is subject to axial movement, the angular deflection capacity is not adversely affected, but the kinematic accuracy of the joint is fully preserved. As the securing of the ball cage to the center ball of the control element preserves the center point distances of the ring of balls with the same deflection, the axial position of the inner part of the joint is of secondary importance. Also, the deflection kinematics of the joint are not affected by varying positions.

Similar considerations apply as regards shafts fitted with two joints where the joint gap is usually altered on the joints deflecting or on axial displacement occurring and which therefore require toothed shifting members— this applies, in particular, to cardan-type joints—arranged inside the joint gap. The arrangement inside the joint gap exposes these elements to a very high degree of wear and they eventually bend and thus constitute a joint with a relatively small deflection angle. In addition, such joints generate unbalance, which increases the wear rate. It is obvious that jointed shafts of this type generate vibration in numerous parts of appliances and/or vehicles. In the case of the proposed invention, shifting members, etc. are not needed. However, should such elements be required for installation purposes, they can, in the case of the joint in accordance with the invention, be blocked to prevent further axial movement and thus wear; this, in turn, substantially reduces the cost of and improves the proposed joint.

If only one joint is used—as in automobile engineering, for example—and one running axle is pivoted, the joint center point is in the main preserved. Only the thrust socket above the joint exhibits a certain degree of axial play and is subject to wear. In the case of the joint in accordance with the invention, the axial movement then possible is taken up on an anti-friction (rolling) basis. In this instance, the joint parts need not be controlled by the springs proposed in accordance with the invention, and the design of the joint is thus simplified even further, especially as the axially movable bushings are no longer needed either. The outer balls of the ball-type control elements can instead be guided direct in the central bores of the outer and inner parts of the joint.

The heart-shaped design of the outer balls is also especially advantages, as this makes a substantial contribution to exact angular control and at a given ratio of the control element for the initial and final angular positions any position between these two points can be exactly achieved. The heart-shaped ball contacts the walls of a cylindrical bore at all deflection angles of the control element, and the varying radius of the heart correctly controls the joint parts in relation to each other in all angular positions in the central range.

Naturally, the joint in accordance with the invention permits the use of devices other than the ball-type control element to axially move the ball cage to the center point of the axial travel distance. A four-joint member, a wedge member, and similar devices have proved advantageous. However, the preferred design uses springs, and especially cup springs, as control elements.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
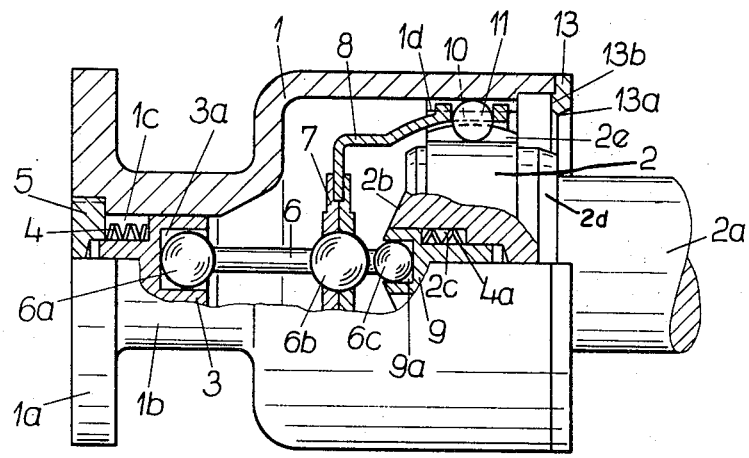
FIG. 1 shows a partial axial section through a joint in the zero position embodying the present invention.
Figure 2:
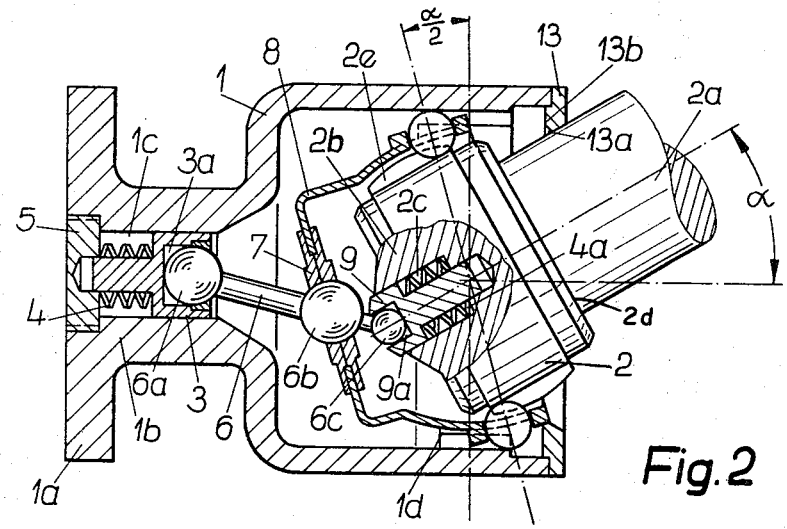
FIG. 2 shows an axial section through the joint of FIG. 1 arranged in a deflection angle of approximately 30°.

In FIGS. 1 and 2, the outer part or housing member of the joint is designated 1 and the inner part of the joint is designated 2. Outer part 1 ends in a flange 1a, and the inner part 2 ends with the longitudinally extending shaft 2a.

A bore 1c is provided on the longitudinal axis of the housing member 1 within its connecting element 1b and a bush 3 is movably arranged in the bore. The end of bush 3 directed toward the flange 1a is reduced in diameter as compared with its end facing toward the inner part 2 and the space provided is used to accommodate a spring 4, which, as shown, is a cup design. The spring 4 can be pre-tensioned using a threaded nut 5 located in the flange 1a.

The end of bush 3 directed toward the inner part 2 of the joint features a central recess or socket 3a in which a ball 6a is positioned, the ball being part of a control element 6. The control element 6 also comprises a central ball 6b and a ball 6c. The central ball 6b is enclosed by a split ball socket 7, which, in turn, is connected to a ball cage 8.

A hub 2b of the inner part 2 also contains a recess or socket 2c, located on the longitudinal axis of the joint in its undeflected position. Bush 9 is of a similar design to its counterpart, the bush 3, and is movably arranged in the recess 2c of control element 6 is engaged in a central recess 9a in the bush 9 and spring 4a ensures that bush 9 is always in contact with ball 6c.

As axial movement is taken up on an antifriction (rolling) basis, springs 4 and 4a and bushes 3 and 9 can be dispensed with if required. The design of the joint is then even more simplified, especially as balls 6a and 6c are guided directly in the bores 1c and the recess 2c in this case. This naturally also reduces the installation length of the joint. If springs 4 and 4a are used, they can also be arranged in layers to dampen shaft 2a in the event any axial vibration develops.

When the joint is not angularly deflected, control element 6 is located exactly on the longitudinal axis of the joint. As the joint deflects, balls 11 of the ball ring are moved and bisect the angle of deflection $[\alpha/2]$, see FIG. 2. Their movement is controlled by control element 6 and ball cage 8 to which both control element 6 and the balls 11 are connected.

Balls 11 are located in axial extending grooves 1d and 2e of the inner and outer parts of the joint and are carried in cage 8.

A narrow gap 10 tending to zero is located between joint parts 1 and 2 through which the ball cage 8—preferably of ball-socket design—projects.

Ball cage 8 features fingers (not shown) which keep balls 11 in one plane at all times.

The fingers feature lugs (not shown) which prevent the balls dropping out during assembly.

Figure 4:
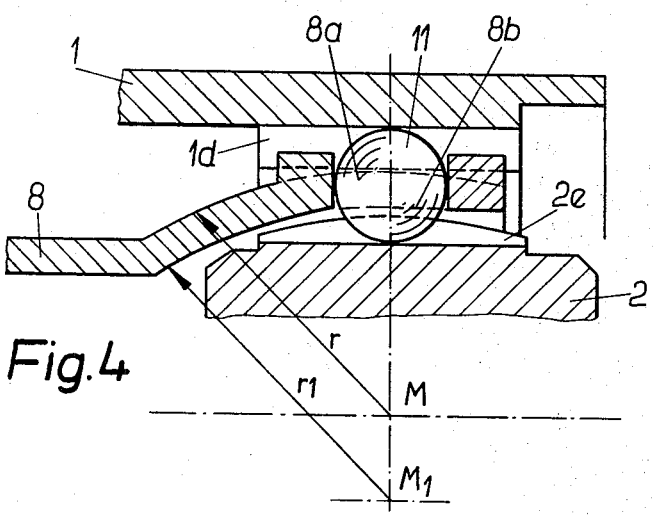
FIG. 4 shows a detail of the ball cage design illustrated in FIG. 1.

As shown in FIG. 4, the outside 8a of cage 8 is of a spherical design, whereas the inner surface 8b is of a cylindrical design. This latter design ensures very simple installation, as cage 8 with balls 11 can be easily pushed axially onto joint inner part 2 without any difficulty. Joint outer part 1 can then be pushed over the cage 8 just as easily, conveniently, and without any problems.

Center point $M_1$ of ball radius $r_1$ of inside diameter 8b is outside the joint center position when the joint is in the zero position. This larger radius on the inner diameter of the cage 8 permits comparatively greater axial movement of the latter relative to joint inner part 2.

In the direction of joint outer part 1, the ball cage 8 is formed by a face wall that terminates in any desired shape, e.g. cone-shaped or cylindrical, at the transition point to the spherical part 8a. The split ball socket 7 is connected to this face wall (FIGS. 1 and 2) and central ball 6b is carried free to move in the ball socket. The angular movement of the joint is not affected by this jointed connections, and the kinematic accuracy of the overall joint arrangement is thus fully preserved.

Shaft 2a can be moved axially by the same distance to both sides of the central point shown in FIG. 1.

If external forces, e.g. impacts, cause shaft 2a to move to the left, i.e. in the direction of joint outer part 1, ball cage 8 and its balls 11 are arranged to bisect the distance travelled by means of springs 4 and 4a, which have the same characteristics. When the joint is moved axially in the non-deflected state, balls 11 are also automatically moved by one half of the distance covered by the axially displaced shaft 2a. If axial movement occurs when the joint is deflected by a considerable angle, the balls are guided in the (then crossed) grooves 1d and 2e, which means that they have to cover a distance somewhat greater than one half; springs 4 and 4a permit this additional movement.

Figure 3:
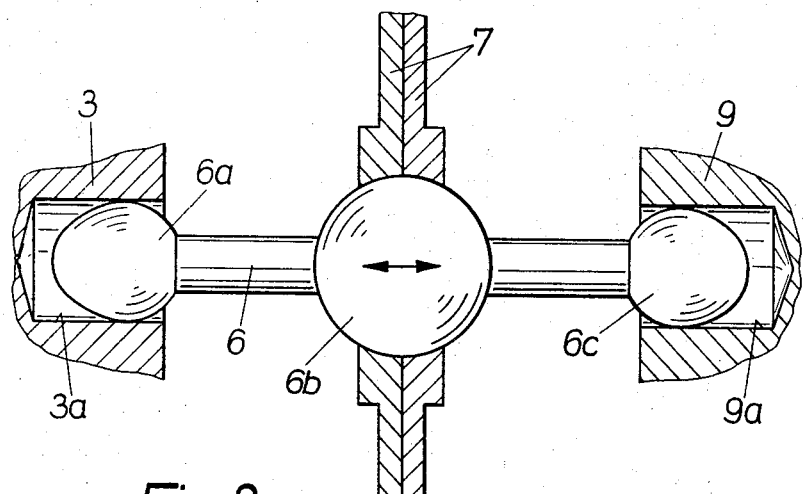
FIG. 3 shows a control element in accordance with the present invention having heart-shaped outer balls.

For mathematically exact angular control, balls 6a and 6c can also be designated with a heart-shaped cross section (FIG. 3) so that at a given ratio of the control element for the initial and final angular positions any intermediate position can be accurately attained. The heart-shaped balls—which are in contact with the walls of cylindrical recesses 3a, 9a, disposed within the bore 1c and the recess 2c, respectively, at every new position of the control element—allow the joint to be directed into any angular position in the central range.

FIG. 2 shows the joint in its maximum angularly deflected position. In this position, inner part 2 contacts a surface 13a of cover 13; surface 13b serves as a stop for surface 2d of joint inner part 2 when the joint is fully extended.

Figure 6:
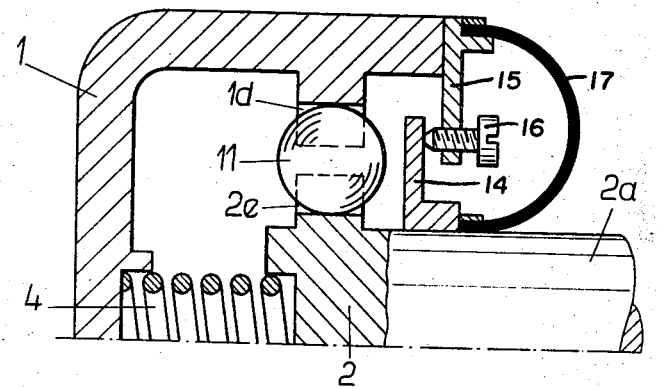
FIG. 6 shows a detail of an alternate embodiment of the joint with stops for angular and axial limitation and with a rotary-symmetrical bellows covering the joint.

FIG. 6 shows a different stop system. Shaft 2a carries a disk 14 and joint outer part 1 a further disk 15. Both are arranged radially to the joint and at a certain axial distance from one another.

Disk 14 serves to limit angular movement of the joint inner part 1 in relation to joint outer part 2, and disk 15 limits axial movement. The two disks 14 and 15 can be adjusted in relation to each other by means of screws 16 arranged around the circumference of disk 15. These screws are also used to facilitate installation of the joint, as springs 4 and 4a—because of their pre-tension—tend to press joint part 1 and 2 apart. The joint halves 1 and 2 are enclosed and sealed off in a very simple but extremely efficient manner by the semi-circular bellows 17, one edge of which is secured against shaft 2a and the other to a shoulder on disk 15. This produces the further adavntage that with the short-design joint the connecting points of the bellows on the outer and inner parts of the joint can be brought nearer to the joint center, thereby considerably increasing the service life of the bellows, which is, in fact, a rather sensitive element.

Naturally, stops of other design can be employed e.g. grooved nuts, which replace the inner disk and the screws.

Figure 5:
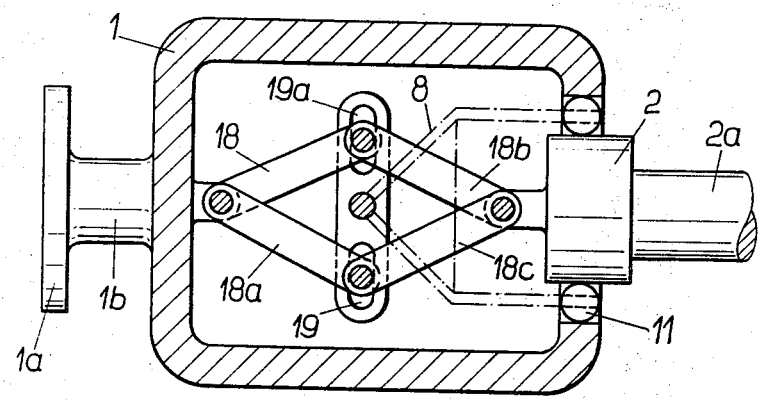
FIG. 5 shows a schematic representation of a four-joint member as a control element.

Instead of the spherical and/or heart-shaped elements of the control member 6, a four-joint member comprising hte four guides 18, 18a, 18b, and 18c can be used, see FIG. 5. In this solution, guides 18 and 18a are pivoted to the outer part 1 of the joint, the guides 18b and 18c to the inner part 2 of the joint. The center turning points of the guides are elongated holes, slits, or similar means 19a in link 19, which also serves to secure the ball cage 8 shown in chain-dot outline.

While specific embodiments of the invention have been shown and described in detail to illustrate the application of the inventive principles, it will be understood that the invention may be embodied otherwise without departing from such principles.

What is claimed is:

1. A joint arranged to have a high degree of angular and axial movement is comprised of an outer housing member forming a chamber having a longitudinally extending axis, a longitudinally extending inner member having at least one end thereof positioned within said chamber, said inner member spaced inwardly from said housing member within said chamber and being axially and angularly displaceable therein and having a zero position therein in respect to axial and angular displacement relative to said housing member in which zero position the longitudinal axis of said inner member is in axial alignment with the longitudinal axis of said chamber, a longitudinally extending control element disposed within said chamber and being movably secured in the axial and angular direction within said outer housing member and said inner member at longituidnally spaced points, said control element extending longitudinally along the longitudinal axis of said outer housing member and said inner member when said inner member is in the zero position, said control element being longitudinally movable relative to said inner member and to said outer housing member, a ball cage attached to said control member intermediate its points of engagement with said outer housing member and said inner member, and a plurality of balls positioned within said ball cage and disposed within the space between and in contact with said outer housing member and said inner member, and said balls movably positionable with said ball cage while remaining in contacting relationship with said outer housing member and said inner member for affording axial and angular displacement of the inner member relative to said outer member whereby as said inner member is deflected angularly said balls are moved through an angle which is half of the angle of deflection of said inner member.

2. A joint as set forth in claim 1, wherein said control element comprises a longitudinally extending support member, a contact member at each end of said support member for interengagement with said outer housing member and said inner member, and an intermediate contact member disposed intermediate the ends of the support member and arranged for movable engagement with said ball cage.

3. A joint as set forth in claim 2, wherein a split socket member is attached to said ball cage and is secured to the intermediate contact member of said control element for affording movable engagement between said ball cage and said intermediate contact member of said control element.

4. A joint as set forth in claim 2, wherein said outer housing member has a bore formed therein along its longitudinal axis at the end thereof opposite said inner member, a movable member disposed within the bore and having a recess therein on the longitudinal axis of said outer housing member and facing said inner member, said inner member having a recess therein disposed on the longitudinal axis thereof and facing toward the bore in said housing member, a movable member disposed within said recess and having a recess located on the longitudinal axis of said inner member and facing toward said member in said housing member, said control element having its end contact members disposed within the recesses formed in said members disposed within the bore and the recess of the outer housing member and said inner member respectively.

5. A joint as set forth in claim 4, wheerin a spring member is disposed within each of the bore in said outer housing member and the recess in said inner member and is arranged for maintaining said members disposed therein in engagement with the end contact member elements of said control element.

6. A joint as set forth in claim 5, wherein adjustable means are provided in said outer housing member for pretensioning the spring within the bore therein.

7. A joint as set forth in claim 4, wherein said end and intermediate contact elements on said control element are in the form of spheres.

8. A joint as set forth in claim 4, wherein said end contact members of said control element have a heart-shaped configuration with the pointed portions thereof directed into the recesses in the members disposed within the bore of and the recess of said outer housing member and inner member respectively.

9. A joint as set forth in claim 1, wherein axially extending grooves are formed in the inner surface of said outer housing member and the oppositely disposed surface of said inner member for receiving the balls contained within said ball cage.

10. A joint as set forth in claim 1, wherein said outer housing member comprises a flange located at its end remote from said inner member and walls extending from said flange forming the chamber and providing an open end within which said inner member is positioned within the chamber, a cover member located in the opening formed by said walls and affording stop surfaces for the axial and angular displacement of said inner member relative to said outer housing member.

11. A joint as set forth in claim 10, wherein said inner member comprises a hub arranged to be disposed within the chamber in said outer housing member and a longitudinally extending shaft secured to said hub and extending outwardly therefrom through the opening in the end of said chamber.

12. A joint as set forth in claim 11, wherein said outer housing member has a bore formed through said flange and extending along the longitudinal axis thereof into said chamber, a movable bush disposed within said bore, a threaded nut secured within the bore in the flange end thereof remote from said chamber, a spring member disposed within said bore and extending between said threaded nut and said member, said threaded nut ajustably positionable within said bore for pretensioning said spring, said bush having a recess therein on the longitudinal axis of said outer housing member and facing inwardly into the chamber therein.

13. A joint as set forth in claim 12, wherein said hub has a recess formed therein along the longitudinal axis of said inner member and facing inwardly into the chamber within said outer housing member, a movable bush disposed within said recess and having a recess therein directed into said chamber, a spring member disposed within the recess of said hub for urging said bush in the direction of said bush in the bore in said housing member.

14. A joint as set forth in claim 13, wherein said control element has a ball element at one end thereof engaged within the recess in said bush in said outer housing member and another ball element at its other end in engagement within the recess in said bush in said inner member and an intermediate ball element disposed between the end ball elements and a split socket attached to said ball cage with said intermediate ball element positioned within said socket.

15. A joint as set forth in claim 1 wherein resilient means are arranged within said outer housing member and inner member for maintaining movable contact between said control member and said inner member and said outer housing member during angular and axial displacement of said inner member relative to said outer housing member whereby said resilient means assisting in the positioning of said ball cage and also serving as a buffer for absorbing axial impact and for dampening axial vibrations.

References Cited

UNITED STATES PATENTS

| | | | |
|---|---|---|---|
| 2,087,817 | 7/1937 | Saussard | 64—21 |
| 2,352,776 | 7/1944 | Dodge | 64—21 |
| 2,953,001 | 9/1960 | Hufstader | 64—21 X |
| 3,162,024 | 12/1964 | Breuer et al. | 64—21 X |
| 3,162,026 | 12/1964 | Ritsema | 64—21 |
| 3,310,961 | 3/1967 | Ristau | 64—21 |

JAMES A. WONG, Primary Examiner

U.S. Cl. X.R.

64—21